(12) United States Patent
Yoshida

(10) Patent No.: US 9,669,685 B1
(45) Date of Patent: Jun. 6, 2017

(54) AUXILIARY VEHICLE SUN VISOR

(71) Applicant: Akifumi Yoshida, San Rafael, CA (US)

(72) Inventor: Akifumi Yoshida, San Rafael, CA (US)

( * ) Notice: Subject to any disclaimer, the term of this patent is extended or adjusted under 35 U.S.C. 154(b) by 0 days.

(21) Appl. No.: 15/090,364

(22) Filed: Apr. 4, 2016

(51) Int. Cl.
B60J 3/02 (2006.01)

(52) U.S. Cl.
CPC ........... *B60J 3/0208* (2013.01); *B60J 3/0278* (2013.01)

(58) Field of Classification Search
CPC ........... B60J 3/0208; B60J 3/0278; B60J 3/02
USPC ................................................ 296/97.6, 97.8
See application file for complete search history.

(56) References Cited

U.S. PATENT DOCUMENTS

| | | | | |
|---|---|---|---|---|
| 2,747,926 A * | 5/1956 | Ralls | ..................... | B60J 3/0208 296/97.6 |
| 3,195,946 A * | 7/1965 | Van Sickle | ............ | B60J 3/0208 296/97.6 |
| 3,415,569 A * | 12/1968 | Leevo | ..................... | B60J 3/0208 296/97.6 |
| 4,330,148 A * | 5/1982 | LaMont | ................. | B60J 3/0208 24/561 |
| 4,950,021 A * | 8/1990 | Vandagriff | ............. | B60J 3/0208 296/97.11 |
| 5,271,653 A * | 12/1993 | Shirley | ................... | B60J 3/0208 296/97.6 |
| 6,290,280 B1 * | 9/2001 | Riekse | ................... | B60J 3/0208 296/97.6 |
| 7,556,308 B2 * | 7/2009 | Lee | ........................... | B60J 3/023 296/97.1 |
| 7,686,372 B2 * | 3/2010 | Suzuki | ...................... | B60J 3/02 296/97.4 |
| 8,708,395 B1 * | 4/2014 | Kim | ...................... | B60J 3/0208 296/97.1 |
| 9,132,719 B1 * | 9/2015 | Pernia | .................... | B60J 3/0208 |
| 2005/0230998 A1 * | 10/2005 | Im | .......................... | B60J 3/0208 296/97.6 |
| 2014/0118833 A1 * | 5/2014 | Prokhorov | ............. | B60J 3/0208 359/614 |

FOREIGN PATENT DOCUMENTS

| | | | | |
|---|---|---|---|---|
| DE | 3151315 A1 * | 7/1983 | ............ | B60J 3/0208 |
| FR | 2728198 A1 * | 6/1996 | ............ | B60J 3/0208 |
| GB | 2321629 A * | 8/1998 | ............ | B60J 3/0208 |
| ZA | WO 2010057228 A1 * | 5/2010 | ............ | B60J 3/0208 |

* cited by examiner

*Primary Examiner* — Ruth Ilan

(57) ABSTRACT

An auxiliary vehicle sun visor system is provided for use in a vehicle having a window and a front windshield. The system is a simple design and does not involve sophisticated or elaborate mechanism or device. The auxiliary sun visor is formed in J-shape view from a side in one piece. It is mounted to a main sun visor adjacent to the distal end of a main sun visor. It is rotatable at the pivotal axis in the same plane as the main sun visor and position it as needed by one hand. This allows the auxiliary sun visor to be placed between a user and an unwanted light source while operating a vehicle in a normal and safe manner.

2 Claims, 4 Drawing Sheets

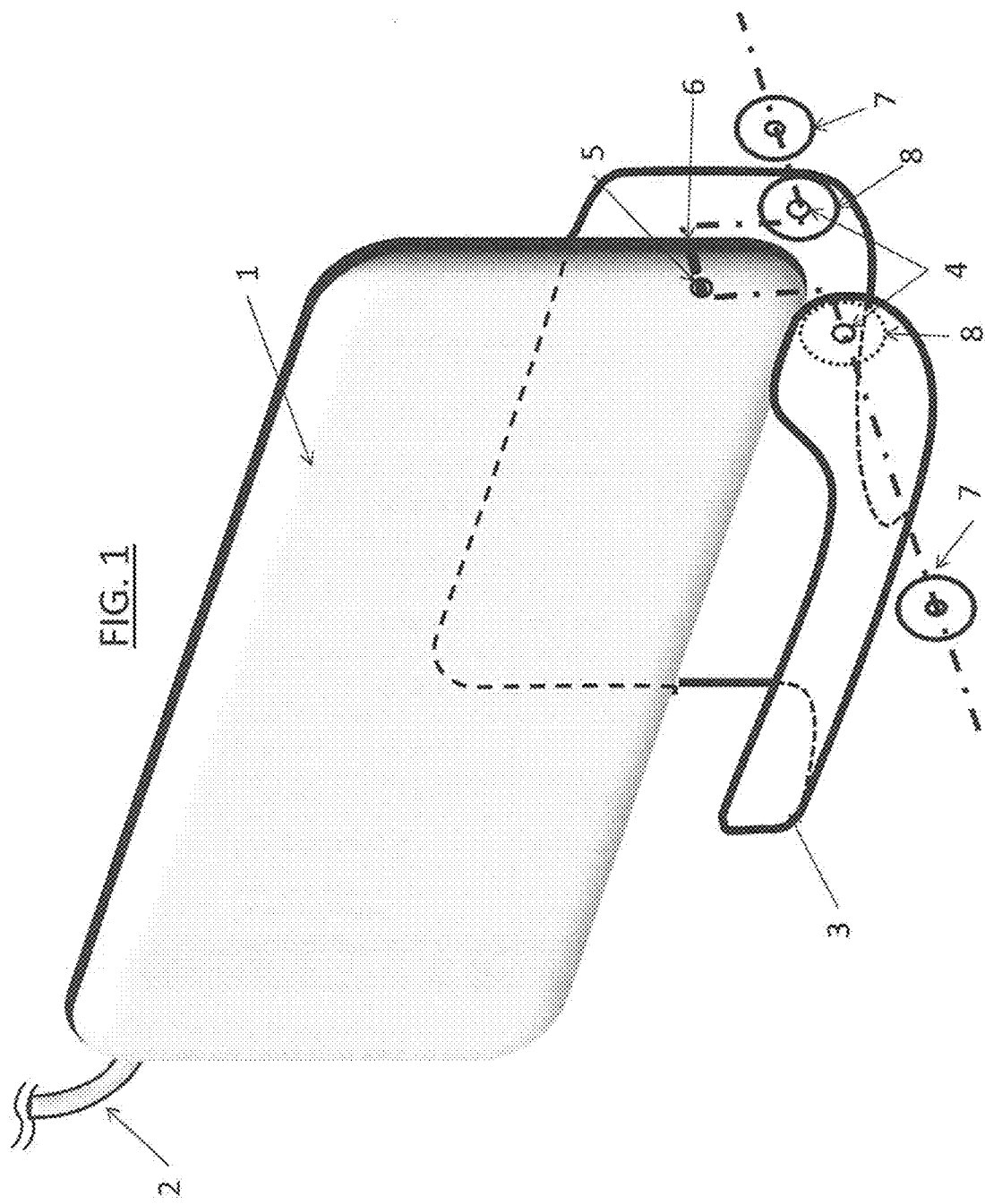

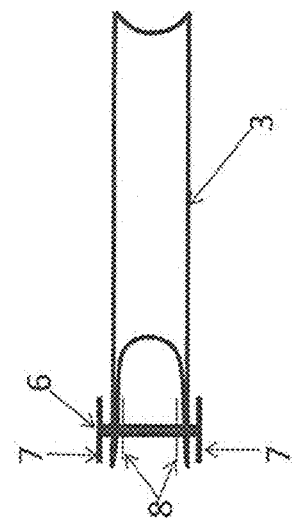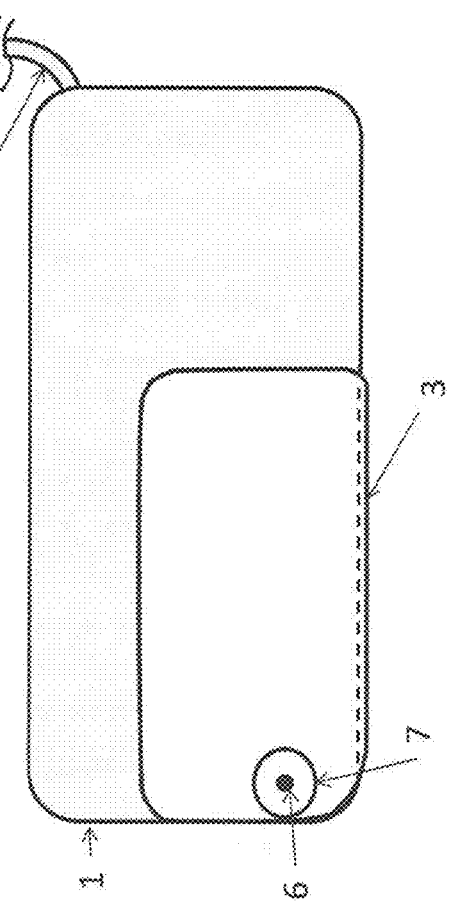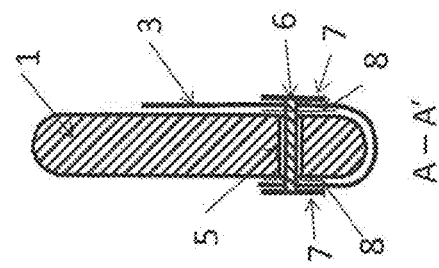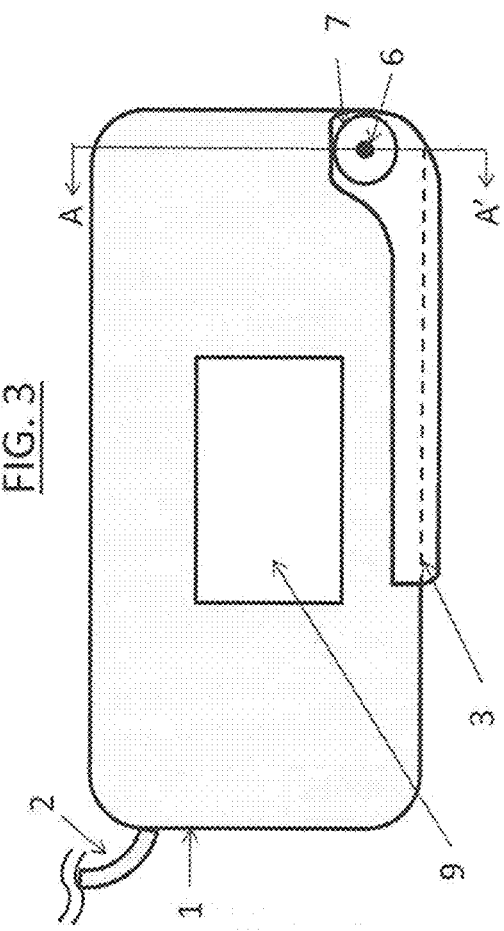

AUXILIARY VEHICLE SUN VISOR

TECHNICAL FIELD

This invention relates to a vehicle sun visor. The present invention relates particularly to an auxiliary sun visor system attached to the main sun visor with a pivotal point adjacent to a distal end of the main sun visor and rotates along on the same plane as the main sun visor.

BACKGROUND OF THE INVENTION

Referring to FIG. 6, the deficiency in the current main vehicle sun visor is visually obvious. The current vehicle sun visors are not particularly effective when the sun is hitting the user's eye or head from a lower angle or at an angle from the window or windshield, especially when the eye level of a driver operator or a passenger is low or the head is located farther back close to the center door pillar as in a normal sitting position in the seat of a vehicle. These sun visors are often low enough or long enough to block the sun's ray hitting an eye or a head. Because of the changing directions and angles of the incoming sun's ray into the vehicle, the safety and comfort of the driver or passenger are impaired.

Many sun visor prior arts have been already discussed or are currently commercially available.

For example, the U.S. Pat. No. 9,132,719 granted to Pernia shows a sun visor clipped on the main sun visor. The user needs to move the clip and swing it where it is needed. However, it swings open at the same height as the main sun visor. It does not rotate downward or extend beyond the main sun visor.

The U.S. Pat. No. 8,708,395 granted to Kim shows a double hinged sun visor plate attached to a main sun visor. Again, it is mounted on the main sun visor in the proximal section of the main sun visor close to the front windshield pillar.

The U.S. Pat. No. 7,686,372 granted to Suzuki shows a motorized spot sun visor mounted on a window.

The U.S. Pat. No. 7,556,308 granted to Lee, at al shows a multi directional sun visor system. It employs a sophistically designed pivotal apparatus. However, the mount is at the proximal end of the sun visor near the windshield pillar of a vehicle. It does not cover the lower rear area of the side window near the center door pillar of a vehicle.

The U.S. Pat. No. 6,290,280 shows a simpler hinge and knob design for the two dimensional adjustment of the sun visor. Again, it is mounted near the front windshield pillar. It requires a manual adjustment of the positioning device.

The U.S. Pat. No. 4,950,021 granted to Vandagriff shows a swing visor system where a visor attachment rotates at the pivotal axis proximal to the main visor mount to the vehicle body structure. The arc plane of this visor sweeps 90 degrees along a side window away from the user and does not extend far back enough to block the sun hitting the user's eye.

A sun visor extender already available on some vehicles extends a smaller rectangular sun visor horizontally sliding out of a main sun visor. However, it does not get low enough to block the sun hitting the user's eye at a low level or at a low sun's angle. Also, there are some oversized sun visors which add more weight.

As described above, many prior arts employ sophisticated positioning apparatus or involved operation by the user during a normal vehicle operation or adjustments by stopping a vehicle.

The present invention addresses and improves the disadvantages inherent in the prior art sun visors. This invention is a simple but innovative design and is made of a light weight material.

1. This invention shows an innovative pivotal axis location of the auxiliary sun visor relative to the main sun visor. This auxiliary sun visor sweeps from the pivot point located adjacent to a distal end of the main sun visor instead of the common pivotal point at a proximal section of the main sun visor where it is mounted to a vehicle body structure. Therefore, the arc of the sweep covers the area close to the position of the eye or the head of a vehicle driver or a passenger where it is most needed, especially for drivers whose normal sitting position is low and back close to the center door pillar in a vehicle. It covers, as needed, wider areas than the current or prior arts, yet, is narrow enough to see through the auxiliary sun visor in case of its transparent material, or to see the road from either side of this auxiliary sun visor in case of its opaque material. In addition, it does not obstruct viewing of the side rear view mirror. It can be also positioned to shield the incoming sun's ray from the front windshield.
2. This invention shows an innovative, yet a simple formed shape design of an auxiliary sun visor. It conforms partly to the main sun visor perimeter so that it can hug the main sun visor when not in use. This minimizes any unsightly protrusion in the interior of a vehicle.
3. The user can operate said auxiliary sun visor easily and effectively and quickly reposition said auxiliary sun visor by one hand while safely driving as normally done for the main sun visor.
4. This invention does not employ a sophisticated or elaborate pivoting mechanism or device.
5. With this innovative auxiliary sun visor, the only operation needed is to position it to shade the incoming sun's ray. It can also be employed to block the sun's ray coming in from the front windshield.
6. With this innovative auxiliary sun visor, the user requires no set up, no tools, no interruption of vehicle operation, no relocation of a sun visor clip or other attaching means and no adjustment other than re-positioning it by one hand.

DESCRIPTION OF THE INVENTION

FIG. 6 visualizes the intended concepts and purposes of this invention for illustrating purposes. This innovative auxiliary sun visor system is described in detail below.

Referring to the drawings, FIG. 1 is an isometric exploded view of the auxiliary sun visor system of this innovative present invention. The drawing shows the pivotal point of said auxiliary sun visor relative to the main sun visor. It also shows the design shape, and a mounting and pivotal pin in the main sun visor which is described in detail below.

As clearly shown on the drawing. FIGS. 1, 2, 3 and 6, said auxiliary sun visor (3) has a pivotal axis point as performed by the mount pin (6), adjacent to the distal end of a main sun visor (1) which is the opposite to the proximal end where the main sun visor is mounted to the body structure as indicated by the main sun visor mount (2).

Referring to FIG. 5, said auxiliary sun visor (3) is formed in a J-shape from one piece thin material such as transparent or opaque plastic. It conforms partly in the same shape as the main sun visor perimeter so that it can hug the external wall of the main sun visor to minimize an unsightly protrusion in the interior of a vehicle when not deployed.

A means to secure the pivotal pin is understandably required. However, for illustrating purposes, the end flanges are shown in the drawings. Other securing means such as flat head bolt/nut, etc. may be employed but not shown. The end flanges firmly and tightly hold the auxiliary sun visor to the main sun visor, yet it can be positioned by one hand and stay in place.

Plural friction washers (8) are shown in FIGS. 1, 4 and 5, which also act as a spacer between the walls of said auxiliary sun visor (3) and the main sun visor (1). The purpose of a friction washer (8) is that the auxiliary sun visor (3), when deployed and rotated, stays in a downward or horizontal position. However, they may not be required depending on the design, the surface texture and the material of the main sun visor (1) and said auxiliary sun visor (3).

THE LIST OF DRAWING NUMERALS

1—Main sun visor
2—Main sun visor mount to a vehicle structure
3—Auxiliary sun visor
4—Auxiliary sun visor mounting and pivotal pin hole
5—Main Sun visor pivotal pin hole
6—Auxiliary sun visor mounting and pivotal pin
7—Auxiliary sun visor mounting pivotal pin flange
8—Friction washer
9—Mirror on main sun visor for an illustration purpose
10—Cavity in main visor
11—Alternate auxiliary sun visor
16—Alternate auxiliary sun visor mounting pin
17—Alternate auxiliary sun visor mounting pin flange
18—Alternate auxiliary sun visor friction washer
19—Alternate auxiliary sun visor pull tab

BRIEF DESCRIPTION OF DRAWINGS

FIG. 1 shows an isometric exploded view of the auxiliary sun visor mounted on a main sun visor.

FIG. 2 shows a front view of the auxiliary sun visor mounted on a main sun visor.

FIG. 3 shows a rear view of the auxiliary sun visor mounted a main sun visor.

FIG. 4 shows a top view of auxiliary sun visor.

FIG. 5 shows the cross section A-A' in FIG. 3.

DETAILED DESCRIPTION OF DRAWINGS

Figure 6:
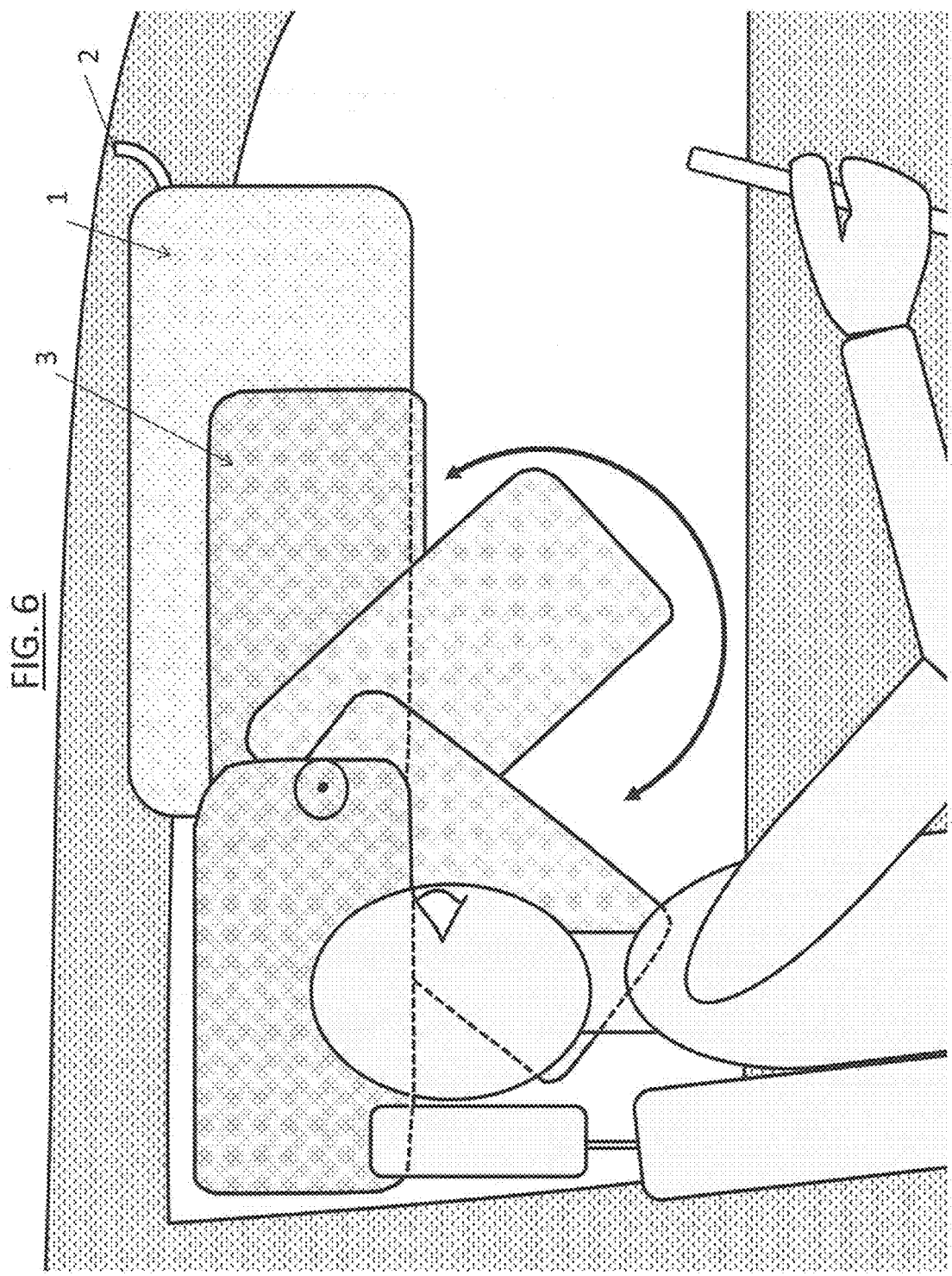
FIG. 6 shows various positions of the auxiliary sun visor.

FIG. 1 shows an isometric exploded view of the main sun visor (1) and attached auxiliary sun visor (3). The auxiliary sun visor (3) is mounted on the main sun visor (1) adjacent to a distal end of the main sun visor (1). The mounting hardware is comprised of a pivotal axis mounting pin (6) through the pin hole (5) on the main sum visor (1). The pivotal pin (6) is secured by a flange (7) at each end external to the auxiliary sun visor (3). A friction washer (8) is mounted on the pivotal pin (6) and between the walls of the main sun visor (1) and the auxiliary sun visor (3).

FIG. 2 shows a driver view of said auxiliary sun visor (3) of FIG. 1 when the main sun visor (1) is positioned against the driver side window. In this drawing, the auxiliary sun visor (3) is not yet deployed.

FIG. 3 shows said aux. sun visor (3) when looking through a driver side window of a vehicle. For illustration purposes, an installed mirror (9) is shown in the main sun visor (1) to show the clearance to the auxiliary sun visor (3).

FIG. 4 shows a top view of the auxiliary sun visor (3) with mounting hardware.

FIG. 5 shows the cross section A-A' in FIG. 3, envisioning the J-shaped auxiliary sun visor (3).

FIG. 6 shows various positions of the aux. sun visor (3) of FIG. 1 when deployed and rotated out of the main sun visor (1).

Figure 7:
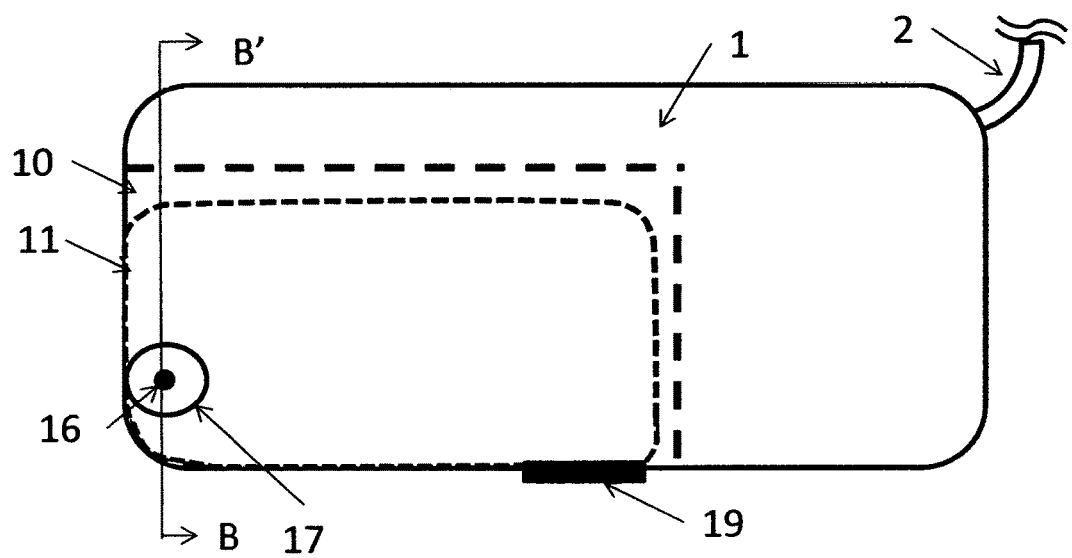
FIG. 7 shows a front view of the alternate auxiliary sun visor design.

FIG. 7 shows a front view of an alternate auxiliary sun visor (11) housed in the cavity (10) of the main sun visor (1) with an external pull tab (19).

Figure 8:
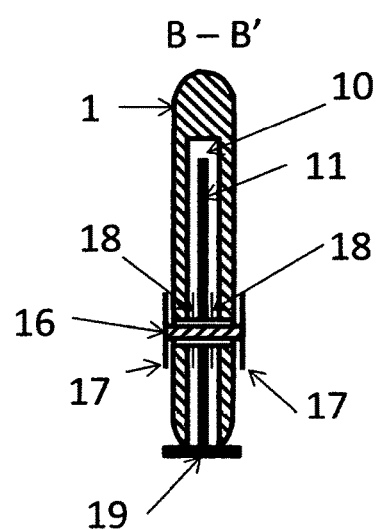
FIG. 8 shows the cross section B-B' in FIG. 7.

FIG. 8 shows the cross section B-B' in FIG. 7 showing a flat auxiliary sun visor (11) stowed in the cavity of the main sun visor (1).

DETAILED DESCRIPTION OF THE PREFERRED EMBODIMENTS

Referring to the drawings, an auxiliary sun visor system of the present invention is indicated in FIG. 1. The system includes said aux. sun visor (3) and its mounting and pivotal pin (6) configured to penetrate the thickness of the main sun visor (1) through a pivotal pin hole (5) in the main sun visor (1). The pivotal pin hole (5) is located adjacent to a distal end, opposite to the proximal end of the main sun visor mount (2) to the vehicle structure. Securing means of flanges (8) are shown for the mounting and pivotal pin (6). The flanges (8) firmly and tightly hold the auxiliary sun visor (3) to the main sun visor (1), yet the auxiliary sun visor (3) can be rotatable and positioned by one hand where needed and stay in place. A set of two friction washers (8) is inserted between the walls of the main sun visor (1) and the auxiliary sun visor (3). The friction spacers (8) provide enough friction to hold the auxiliary sun visor (3) in place when it is deployed and rotated to a downward or a horizontal position as shown in FIG. 6. In addition, the friction washers (8) act as spacers between the main sun visor (1) and the auxiliary sun visor (3).

As shown in FIG. 5, the auxiliary sun visor (3) is formed in a J-shape from a sheet of plastic. The J-shape conforms partly to the exterior shape of the main sun visor (1). This shape also provides stiffness to the auxiliary sun visor (3).

Referring to FIG. 3, this rear view shows the shorter leg side of the J-shaped auxiliary sun visor (3) provides enough clearance to a mirror (9) installed in the main sun visor (1).

Alternate Embodiments

Either a longer or a shorter flat plane defined in the side view of a J-shaped aux. sun visor (3) or a flat plane of substantially rectangular in shape can be housed internally to the main sun visor cavity (10).

For an example, referring to FIG. 7 and FIG. 8, said alternate auxiliary sun visor (11) is housed internally in the cavity (10) of the main sun visor (1). The aux. sun visor (11) is mounted similarly by a pivotal pin (16) through the thickness of the main sun visor (1). In this case, said auxiliary sun visor (11) is rotated out from the main sun visor cavity (10) by means of, an externally located pull tab (19).

The friction washers (8 or 18) can be eliminated depending on the material and surface texture of the main sun visor (1) or the auxiliary sun visor (3 or 11).

The auxiliary sun visor (3) can be mounted on the main sun visor (1) by a secure adhering means such as a clip or a hook and loop tape in lieu of the hole (5) and the pin (6) in the main sun visor (1).

While the present invention has been shown and described with reference to the foregoing preferred and alternate embodiments, it is to be understood by those skilled in the art that other changes in form and detail may be made therein without departing from the spirit and scope of the invention as defined in the appended claims.

What is claimed is:

1. A sun visor system for use in a vehicle comprising:
    an auxiliary sun visor having a J-shape configuration formed in one piece as seen in a side view and comprising an internal wall shape that partially hugs a main sun visor when the main sun visor is in retracted position while conforming to shape of the main sun visor;
    wherein the auxiliary sun visor is firmly and tightly held onto the main sun visor, yet rotatable by one hand in a plane parallel to the plane defined by the main sun visor at a pivotal axis that is adjacent to a distal end of the main sun visor that is opposite from a main sun visor mount location on the vehicle body structure; and
    wherein said auxiliary sun visor is directly mounted on the main sun visor by a pivotal pin which is penetrating through the thickness of the main sun visor and capped by flanges.

2. The sun visor system of claim 1, wherein said auxiliary sun visor has enough frictional resistance to stay in one place, yet is one hand operable while operating the vehicle normally and without stopping the vehicle for its operation.

* * * * *